United States Patent
Giron et al.

(10) Patent No.: US 10,962,857 B2
(45) Date of Patent: Mar. 30, 2021

(54) ELECTROCHROMIC STRUCTURE AND METHOD OF SEPARATING ELECTROCHROMIC STRUCTURE

(71) Applicant: SAINT-GOBAIN GLASS FRANCE, Courbevoie (FR)

(72) Inventors: Jean-Christophe Giron, Edina, MN (US); Li-Ya Yeh, Geilenkirchen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 179 days.

(21) Appl. No.: 15/951,575

(22) Filed: Apr. 12, 2018

(65) Prior Publication Data

US 2018/0299741 A1  Oct. 18, 2018

Related U.S. Application Data

(60) Provisional application No. 62/484,585, filed on Apr. 12, 2017.

(51) Int. Cl.
*G02F 1/153* (2006.01)
*C03B 33/04* (2006.01)
(Continued)

(52) U.S. Cl.
CPC ............ *G02F 1/1533* (2013.01); *B23K 26/40* (2013.01); *C03B 33/0222* (2013.01);
(Continued)

(58) Field of Classification Search
CPC ........ G02F 1/1533; G02F 1/155; G02F 1/161; G02F 2001/1555; B23K 26/40;
(Continued)

(56) References Cited

U.S. PATENT DOCUMENTS 6,552,301 B2  4/2003  Herman et al.
7,372,610 B2  5/2008  Burdis et al.
(Continued)

FOREIGN PATENT DOCUMENTS

EP    2781296 A1    9/2014
WO   2014121261 A1   8/2014
WO   2015075059 A1   5/2015

OTHER PUBLICATIONS

Hermans, Christoph. "Laser cutting of glass," Oct. 25, 2000, SPIE (International Symposium on Optical Science and Technology), Proceeding vol. 4102, pp. 219-226. (Year: 2000).
(Continued)

*Primary Examiner* — Thomas K Pham
*Assistant Examiner* — Mitchell T Oestreich
(74) *Attorney, Agent, or Firm* — Abel Schillinger. LLP; Robert N Young

(57) ABSTRACT

An electrochromic structure can include a substrate and an electrochromic residue disposed on the substrate. The electrochromic structure can include an electrochromic stack on the substrate. A process can be used to separate the structure. The process can include forming a filament in the substrate and applying a thermal treatment to the substrate. Forming a filament can be performed by applying a pulse of laser energy to the substrate. In a particular embodiment, a filament pattern including a plurality of filaments can be formed in the substrate. The substrate can include mineral glass, sapphire, aluminum oxynitride, spinel, or a transparent polymer.

20 Claims, 9 Drawing Sheets

(51) Int. Cl.
*C03B 33/07* (2006.01)
*E06B 3/66* (2006.01)
*B23K 26/40* (2014.01)
*C03B 33/02* (2006.01)
*G02F 1/155* (2006.01)
*G02F 1/161* (2006.01)

(52) U.S. Cl.
CPC ............ *C03B 33/04* (2013.01); *C03B 33/074* (2013.01); *E06B 3/66* (2013.01); *G02F 1/155* (2013.01); *G02F 1/161* (2013.01); *G02F 2001/1555* (2013.01)

(58) Field of Classification Search
CPC ... C03B 33/0222; C03B 33/04; C03B 33/074; E60B 3/66
USPC .......................................................... 359/265
See application file for complete search history.

(56) References Cited

U.S. PATENT DOCUMENTS

| | | | |
|---|---|---|---|
| 7,593,154 | B2 | 9/2009 | Burdis et al. |
| 8,842,358 | B2 | 9/2014 | Bareman et al. |
| 9,102,007 | B2 | 8/2015 | Hosseini |
| 9,102,011 | B2 | 8/2015 | Hosseini |
| 9,182,644 | B2 | 11/2015 | Sbar et al. |
| 9,296,066 | B2 | 3/2016 | Hosseini et al. |
| 2013/0126573 | A1 | 5/2013 | Hosseini et al. |
| 2013/0258438 | A1 | 10/2013 | Sbar et al. |
| 2014/0036338 | A1 | 2/2014 | Bareman et al. |
| 2014/0199519 | A1 | 7/2014 | Schillinger et al. |
| 2014/0340730 | A1 | 11/2014 | Bergh et al. |
| 2014/0340731 | A1* | 11/2014 | Strong .................... G02F 1/155 359/275 |
| 2014/0352358 | A1 | 12/2014 | Washko, Jr. et al. |
| 2015/0034612 | A1 | 2/2015 | Hosseini et al. |
| 2015/0034613 | A1 | 2/2015 | Hosseini |
| 2015/0034616 | A1 | 2/2015 | Olesen et al. |
| 2015/0165563 | A1 | 6/2015 | Manley et al. |
| 2015/0166391 | A1 | 6/2015 | Marjanovic et al. |
| 2015/0166397 | A1 | 6/2015 | Marjanovic et al. |
| 2015/0232369 | A1 | 8/2015 | Marjanovic et al. |
| 2015/0246415 | A1 | 9/2015 | Hosseini |
| 2016/0200621 | A1 | 7/2016 | N'Gom et al. |
| 2017/0023841 | A1* | 1/2017 | N'Gom ................. G02F 1/1533 |

OTHER PUBLICATIONS

International Search Report and Written Opinion for PCT/EP2018/059396, dated Jun. 1, 2018, 17 pages.

* cited by examiner

ELECTROCHROMIC STRUCTURE AND METHOD OF SEPARATING ELECTROCHROMIC STRUCTURE

CROSS-REFERENCE TO RELATED APPLICATION(S)

The present application claims priority under 35 U.S.C. § 119(e) to U.S. Provisional Patent Application No. 62/484,585, filed Apr. 12, 2017, entitled "ELECTROCHROMIC STRUCTURE AND METHOD OF SEPARATING ELECTROCHROMIC STRUCTURE," naming as an inventors Jean-Christophe GIRON and Li-Ya YEH, which application is assigned to the current assignee hereof and is incorporated by reference herein in its entirety.

FIELD OF THE DISCLOSURE

The present disclosure is generally related to electrochromic structures and methods of separating electrochromic structures.

BACKGROUND

Glass is used in electrochromic devices and other window structures, such as a windshield and automotive windows. Typically, electrochromic stacks are formed on mother glass, which is then cut into desired shapes to form individual stacks having a glass substrate. However, forming differently shaped substrates often causes significant waste of the mother glass, because wider gaps between stacks are needed to prevent damage to and ensure success of separation of glass substrates. Oftentimes, additional treatments to cut edges of glass substrates, such as polishing, are used for safety reasons and to improve edge strength. When strengthened (e.g., heat-strengthened or chemical-strengthened) or tempered glass is desired for an electrochromic device, glass is not tempered or strengthened until after the individual electrochromic stacks are formed, because cutting strengthened or tempered glass often fails, and thus, has been deemed difficult in the art. The industry demands improvement in glass cutting.

BRIEF DESCRIPTION OF THE DRAWINGS

Embodiments are illustrated by way of example and are not limited in the accompanying figures.

Figure 1:
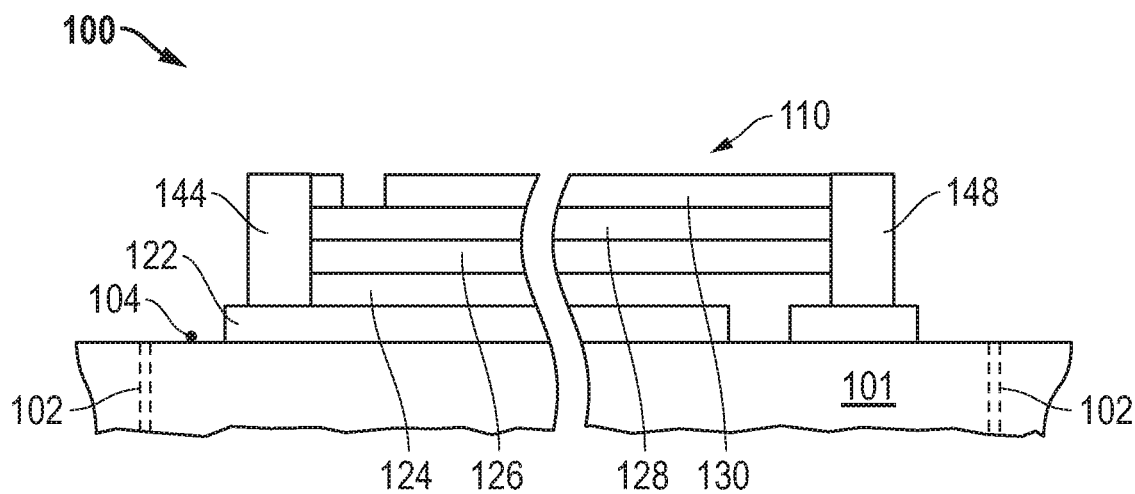
FIG. 1 includes an illustration of a cross sectional view of a structure in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the glass, laser cutting, and electrochromic arts.

Embodiments are related to a process of separating a structure including a substrate. The process can include forming a filament within the substrate. The filament can extend within the substrate in a direction substantially parallel to the thickness of the substrate. In a particular embodiment, a filament pattern can be formed including a plurality of filaments spaced apart from one another. The process can also include applying a thermal treatment to the substrate to separate a portion of the substrate from the remaining portion along the filament pattern. The process can allow formation of a smooth new edge on each portion. From the top view, the new edge can include a curvature, and particularly, include a small radius (e.g., at most 5 µm), or an acute angle, or a combination thereof, as desired by the application. In another particular embodiment, the substrate can include thermally semi-tempered glass, and the process can allow separation of a portion of the thermally semi-tempered glass without chipping the edge or causing another adverse effect.

Other embodiments are related to an electrochromic structure including a substrate and an electrochromic residue. The structure can further include a filament in the substrate. The filament can extend in a direction substantially parallel to the thickness of the substrate. The structure may be separated into portions along a filament pattern including the filament. Each portion can include an electrochromic stack and be used as an electrochromic device without additional treatment to the edge of the portion, such as grinding or polishing.

According to an embodiment, a structure can include a substrate that can be substantially transparent to a laser wavelength. Exemplary substrate can include mineral glass, sapphire, aluminum oxynitride, spinel, or a transparent polymer. An example of the polymer can include polyimide, polyethylene, napthalate (PEM), polyethylene teraphthallate (PET), aramid, or the like. An exemplary mineral glass substrate can be strengthened or tempered glass, such as thermally or chemically strengthened glass, semi-tempered glass, ultra thin glass, float glass, laminated glass, or non-tempered glass, such as borosilicate glass and soda lime glass, or any combination thereof. In this disclosure, the terms, strengthened and tempered, are used interchangeably. In a particular embodiment, the substrate can include semi-tempered glass, particularly thermally semi-tempered glass that can have surface stress of 30 MPa to 60 MPa. The process disclosed herein can be used in treating various substrates and may be particularly suitable for thermally semi-tempered glass.

According to a further embodiment, the substrate can have a thickness in a range between 0.02 mm to 20 mm. In another instance, the thickness can be particularly suitable for deposition of electrochromic devices, automotive window films, or for windshield, or the like. The thickness may vary depending on the type of the substrate. Using glass as an example, for an ultrathin glass substrate, the thickness may be in a range of 20 µm to 300 µm. For thermally semi-tempered glass, the thickness can be at least 1.6 mm and at most 20 mm. Chemical-tempered glass can have the thickness of at least 0.55 mm and at most 1.6 mm, and non-tempered glass at least 0.3 mm and at most 6 mm. In a particular embodiment, the substrate can be thermally semi-tempered glass having thickness in a range of 1.6 mm to 20 mm. In another embodiment, the substrate can be a motherboard having a size of at least 1100 mm×1500 mm. In yet another embodiment, the structure can include a motherboard and a plurality of electrochromic stacks disposed on the motherboard.

According to an embodiment, the structure can include an electrochromic stack disposed on the substrate. According to a further embodiment, the electrochromic stack can be an electrochromic device preform, which can be separated into portions to form individual electrochromic devices. In a particular embodiment, the electrochromic stack can be a solid state electrochromic device. For instance, the electrochromic stack can include an ion storage layer, an electrochromic layer, and optionally an ion conductive layer.

FIG. 1 includes an illustration of a cross-sectional view of an exemplary electrochromic structure 100 including an electrochromic stack 110 of layers 122, 124, 126, 128, and 130 overlying the substrate 101. The structure 100 can include transparent conductive layers 122 and 130 that can include a conductive metal oxide or a conductive polymer. Examples can include a tin oxide or a zinc oxide, either of which can doped with a trivalent element, such as Al, Ga, In, or the like, or a sulfonated polymer, such as polyaniline, polypyrrole, poly(3,4-ethylenedioxythiophene), or the like. The transparent conductive layers 122 and 130 can have the same or different compositions.

The layers 124 and 128 are electrode layers, wherein one of the layers is an electrochromic (EC) layer and the other of the layers is an ion storage layer (sometimes called a counter electrode layer). The EC layer can include an inorganic metal oxide electrochemically active material, such as $WO_3$, $V_2O_5$, $MoO_3$, $Nb_2O_5$, $TiO_2$, $CuO$, $Ir_2O_3$, $Cr_2O_3$, $Co_2O_3$, $Mn_2O_3$, $HfO_2$, $ZrO_2$, $Ta_2O_5$, $Sb_2O_3$, or any combination thereof and have a thickness in a range of 50 nm to 2000 nm. In another embodiment, the EC layer can include a binary compound, a ternary compound, or a quaternary compound including the oxides noted herein. The ion storage layer can include any of the materials listed with respect to the electrochromic layer and may further include nickel oxide (NiO, $Ni_2O_3$, or combination of the two), and Li, Na, H, or another ion and have a thickness in a range of 80 nm to 500 nm. In a particular embodiment, the ion storage layer can include an oxide including Li, Ni, and another element including Nb, Ti, Hf, Zr, Sb, or V.

An ion conductive layer 126 (sometimes called an electrolyte layer) is optional, is between the electrode layers 124 and 128, and has a thickness in a range of 20 microns to 60 microns. The ion conductive layer 126 allows ions to migrate therethrough and does not allow a significant amount of electrons to pass therethrough. The ion conductive layer 126 can include a silicate with or without lithium, aluminum, zirconium, phosphorus, boron; a borate with or without lithium; a tantalum oxide with or without lithium; a lanthanide-based material with or without lithium; another lithium-based ceramic material; or the like.

After reading this specification, skilled artisans will appreciate that other compositions and thicknesses for the layers 122, 124, 126, 128, and 130 can be used without departing from the scope of the concepts described herein.

Each of the transparent conductive layers 122 and 130 include portions removed, so that the bus bars 144 and 148 are not electrically connected to each other. Such removed portions are typically 20 nm to 2000 nm wide. In a particular embodiment, the bus bar 144 is electrically connected to the electrode layer 124 via the transparent conductive layer 122, and the bus bar 148 is electrically connected to the electrode layer 128 via the transparent conductive layer 130. The bus bars 144 and 148 include a conductive material. In an embodiment, each of the bus bars 144 and 148 can be formed using a conductive ink, such as a silver frit, that is printed over the transparent conductive layer 122. In another embodiment, one or both of the bus bars 144 and 148 can include a metal-filled polymer, such as a silver-filled epoxy. In a particular embodiment (not illustrated), the bus bar 148 can include the conductive-filled polymer that is disposed over the transparent conductive layer 130 and spaced apart from the layers 122, 124, 126, and 128. The viscosity of the precursor for the metal-filled polymer may be sufficiently high enough to keep the precursor from flowing through cracks or other microscopic defects in the underlying layers that might be otherwise problematic for the conductive ink.

The structure 100 can also include busbars 144 and 148. The busbars 144 and 148 can be coupled to the transparent conductive layers 122 and 130, respectively.

According to a further embodiment, the structure can further include a residue on the substrate. The residue can be from a portion of the electrochromic stack. Referring to FIG.

1, a residue 104 is disposed on the substrate 101 and spaced apart from the electrochromic stack 110. According to a further embodiment, the residue may include a composition of a layer or a combination of layers of the electrochromic stack, such as tungsten oxide ($WO_3$), molybdenum oxide ($MoO_3$), niobium oxide ($Nb_2O_5$), titanium oxide ($TiO_2$), copper oxide (CuO), iridium oxide ($Mn_2O_3$), vanadium oxide ($V_2O_3$), nickel oxide ($Ni_2O_3$), NiO, cobalt oxide ($Co_2O_3$), a silicate, or any combination thereof. According to a further embodiment, the residue may result from a process of patterning the electrochromic stack. For instance, the process may include removing a portion of an electrochromic stack from a surface area of the substrate. The removal operation may leave some electrochromic residue in the surface area while the majority, such as more than 95% or more than 99%, of the electrochromic stack portion is removed. Removal of a portion of the electrochromic stack can also result in formation of a scribing lane, which can allow a filament pattern to be formed in the substrate along the scribing lane.

According to a further embodiment, the structure can include at least one filament in the substrate. In another embodiment, the structure can include a filament pattern including a plurality of the filaments extending in the direction substantially parallel to the thickness of the substrate. As illustrated in FIG. 1, the structure 100 includes filaments 102 extending in the direction substantially parallel to the thickness of substrate 101. Each of the filaments 102 can be part of a filament pattern. The filament pattern can facilitate separation of the structure, as disclosed in detail below.

According to an embodiment, the structure can be separated into portions having various shapes and sizes. The separation can be performed such that portions can include part of the substrate and part of the electrochromic stack disposed on the part of the substrate. In some applications, the electrochromic stack may include a layer having a composition that can adversely affect separation of the structure. It may be desired to remove a portion of the electrochromic stack to expose some surface area of the substrate to allow a filament pattern to be formed. For instance, the structure may include a layer that can absorb laser energy, and removal of a portion of the electrochromic stack can be performed prior to using laser to form the filament pattern.

Figure 2:
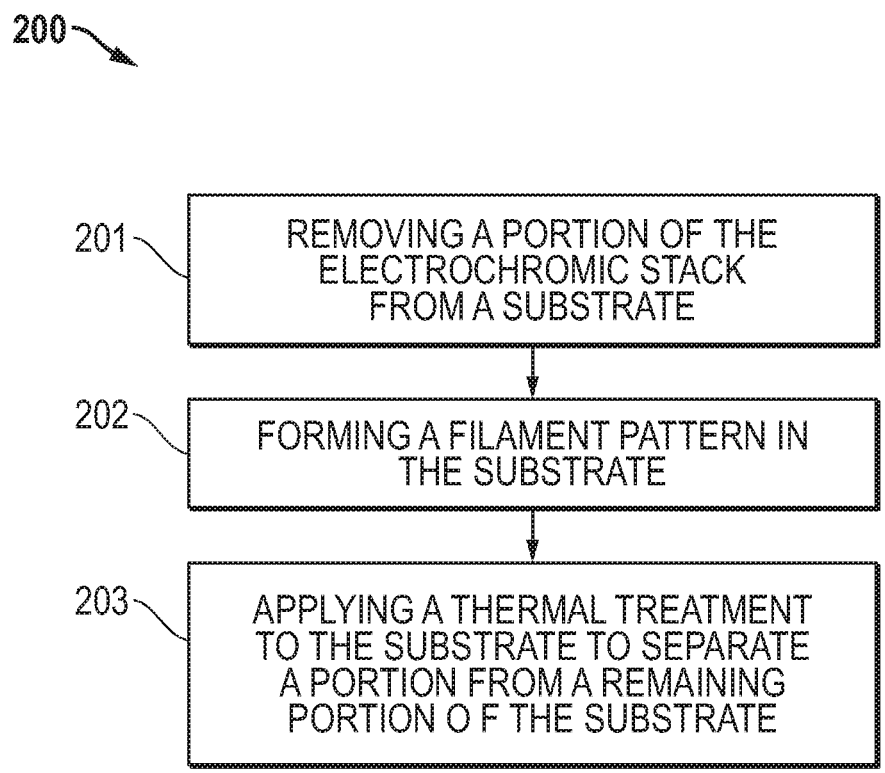
FIG. 2 includes an illustration of a flow chart including a process in accordance with an embodiment.

FIG. 2 includes an illustration of a flow chart including a process 200. As disclosed herein, the process may start from block 201, removing a portion of the electrochromic stack from the substrate. In certain applications, the process may include forming an electrochromic stack and then removing a portion of the stack as illustrated in FIG. 2. Formation of an electrochromic stack can be conducted using the techniques known in the art, such as those disclosed in U.S. Pat. Nos. 7,372,610 and 7,593,154, both of which are incorporated herein by reference in their entirety.

According to a further embodiment, a portion of the stack can be removed by etching, laser ablation, or the like. In a particular embodiment, removal can be performed by ablation, such as laser ablation. If desired, a plurality of discrete portions of the stack can be removed to allow the structure to be separated into more than two portions. According to a further embodiment, the removed portion can have a certain width that can facilitate formation of filament patterns. The width can be the minimum distance between the adjacent edges of the separated stack. In an embodiment, the width can be at least 2 mm to allow laser filamentation to be performed. In another embodiment, the width can be at most 10 mm, such as at most 7 mm or even not greater than 3 mm, to reduce waste on removed materials and substrate without adversely affecting formation of the filament pattern. According to another embodiment, the removed portion can have a length that is the same as or smaller than a dimension of the substrate (e.g., width or length), such as at least 21 mm, such as 57 mm, at least 420 or at least 1020 mm. In another instance, the length may be at most 2130 mm, such as at most 1320 mm, or at most 240 mm. In a further instance, the length can be within a range including any of the minimum and maximum values disclosed herein, such as within a range of at least 21 mm and at most 2130 mm.

According to another embodiment, the gap between the separated stack can be the scribing lane to guide formation of a filament pattern. For instance, a laser beam can directed along the scribing lane. In some applications, a residue may be formed on the scribing lane, and it may be desired to direct the laser beam to avoid the residue, as the residue may have an adverse effect on laser filamentation.

According to a further embodiment, the busbars can be disposed close to the scribing lane. For instance, a distance between the busbar and the scribing lane can be at least 1 mm and at most 3 mm. The distance can help to prevent adverse effect on busbars caused by performing laser filamentation and separation of the structure and reduce waste of the electronic stack and substrate. The distance can be the minimum distance between the scribing lane and the outer edge of the busbar that is closest to the scribing lane.

Figure 3:
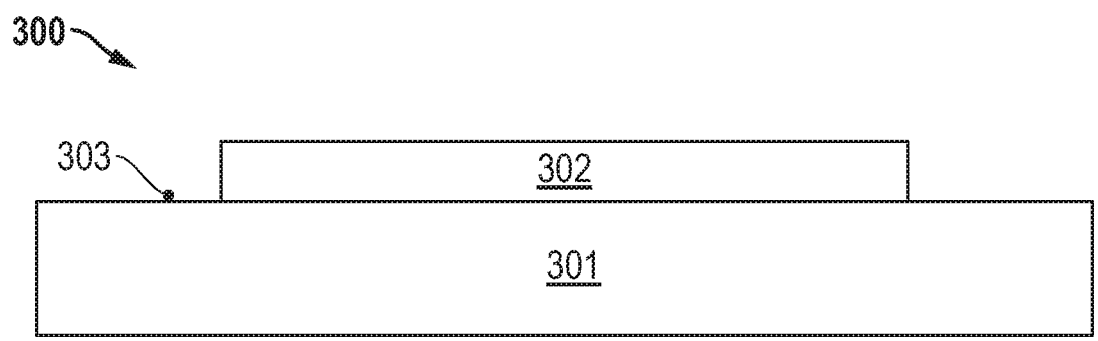
FIG. 3 includes an illustration of a cross-sectional view of a structure in accordance with another embodiment.

According to a further embodiment, the structure can include a coating disposed on the substrate. An exemplary coating can include a low emissivity coating, an indium tin oxide coating, a silver-based coating, or a combination thereof. In applications, the coating can adversely affect laser filamentation, and a portion of the coating can be removed prior to formation of a filament. FIG. 3 includes an illustration of a structure 300 including a coating 302 and a substrate 301. A residue 303 is disposed on the substrate 301 as a result of removal of a portion of the coating 302. According to another embodiment, the coating can consist of a single layer. According to another embodiment, the coating 302 can include a plurality of layers (not illustrated). After reading this disclosure, a skilled artisan will understand that the process disclosed herein can be used to separate other types of structures including a layer or coating disposed on the transparent substrate.

According to a further embodiment, the structure can include a layer or a stack overlying the substrate, and the layer or stack can be transparent to a laser wavelength. The process 200 can start from block 202, as removing a portion of the layer or the stack may not necessary. In some applications, the structure may consist of the substrate, and the process 200 can start from block 202.

Referring back to FIG. 2, at block 202, a filament pattern can be formed along the scribing lane. Forming a filament pattern can include forming at least one filament in the substrate. According to another embodiment, the filament pattern can include a plurality of the filaments. According to a particular embodiment, a laser with pulse burst mode can be used to form a filament pattern. For instance, a pulse of laser energy can be applied to the substrate to form a filament at a desired position, and a plurality of pulses can be applied to form the filament pattern.

As used herein, the term, filament, is intended to refer to void formed in the substrate by laser filamentation. After reading this disclosure, a skilled artisan would understand that embodiments related to a filament or a void can be applied to filaments of a filament pattern.

According to an embodiment, the void can extend in a direction substantially parallel to the thickness of the substrate. As used herein, the term, substantially, is intended to mean, the extending direction of the void and the thickness of the substrate may form an angle within ±10°. The void can have a certain length that can facilitate separation of a portion of the substrate from the remaining portion. The length can extend in the direction substantially parallel to the thickness of the substrate. For instance, the length of the void can be similar to or smaller than the thickness of the substrate. In another instance, the length of the void can be at least 0.3 mm, such as at least 0.7 mm, or at least 2.3 mm. The length of the void can vary as thicknesses of substrates change to suit different applications. In yet another instance, the void length can be at most 5.8 mm, such as at most 5.1 mm, at most 3.8 mm, or at most 2.3 mm. In a further instance, the length of the void can be within a range including any of the minimum and maximum values noted herein, such as within a range of at least 0.3 mm and at most 5.8 mm. In a particular embodiment, the void length can be the same as the thickness.

According to another embodiment, the void can have a width. In some applications, the width can be a diameter. In some applications, the width can be formed such that it can be substantially constant over 80% of the length of the void, such as within 20% of the maximum width of the void. The maximum width is the width having the largest value as measured at positions along the length of the void. According to an embodiment, the width of the void can be at least 0.5 µm, such as at least 0.7 µm or at least 1.3 µm. In a further embodiment, the width of the void can be at most 5 µm, such as at most 4.6 µm or at most 3.9 µm. The width of the void can be within a range including any of the minimum and maximum values disclosed herein, such as within a range of 0.5 µm to 5 µm. According to a further embodiment, the void can have an aspect ratio of length:width. The aspect ratio can be at least 10:1, such as at least 15:1, at least 30:1, at least 50:1, or at least 100:1. In another embodiment, the aspect ratio can be at most 3000:1, such as 2500:1, 2000:1, 3000:1, or 1500:1. The aspect ratio can be within a range including any of the minimum and maximum values disclosed herein, such as within a range of at least 10:1 and at most 3000:1.

According to another embodiment, a plurality of laser pulses can be applied to the substrate to form the void with a desired length. Particularly, for the substrate having a thickness of at least 2 mm and up to 16 mm, a plurality of pulses can be applied. For instance, when forming a filament pattern in a substrate having a thickness of at least 2 mm, more than one pass of the laser pulses can be applied to the substrate to form the voids of the filament pattern. In the first pass, the laser pulses can be focused close to the upper surface along the scribing lane to start formation of the voids. After the first pass, the voids may not have the desired lengths. In a subsequent pass, the laser pulses may be focused at a different depth to extend the length of each void. The process can be repeated until the filament pattern is completed. Comparing to laser pulses of a single-pass process, laser pulses of multiple passes can have larger focus tolerance. For instance, the laser can be focused below the formed filaments or closer to the bottom surface of the substrate to deepen the voids. In an embodiment, a distance between different focus positions can be 0.8 mm to 1 mm such that an optimal overlap of filamentation between passes can be achieved. In another embodiment, more than one laser pulse may be used without moving the laser until a filament is formed. In a further embodiment, energy of the laser can be increased to facilitate formation of the voids with desired length. For instance, a single laser pulse can be applied with increased energy to form the filament. In another instance, laser energy can be increased for each subsequent pass. In some applications, laser pulses may be applied from the same surface of the substrate (e.g., either the upper or lower surface) until the void is formed. Alternatively, both surfaces can be treated simultaneously to form the void. For instance, two lasers can be aligned and used to apply laser energy to the upper and lower surfaces simultaneously to form a void.

According to a particular embodiment, the laser can be ultra-short pulse laser, such as having a pulse duration time of at most 10 picoseconds and at least 1 picosecond. Due to the Kerr effect, a laser beam can propagate in the substrate without diffraction, and propagation can be sustained by cycles of focusing and defocusing of laser pulses, until a void having the desired length is formed.

According to an embodiment, the laser can have a pulse burst frequency of at least 5 kHz and at most 30 kHz and a peak power of at least 350 W and at most 1020 W. The laser can have a wavelength of at least 800 nm and at most 2200 nm and a focus diameter of at most 5 µm, such as at most 2 µm, or at least 0.5 µm. The laser can have a speed at least 100 mm/s and at most 1000 mm/s. In a particular application, the laser can generate a top-hat beam, have a wavelength of 1064 nm, a pulse burst frequency at 15 kHz, and a peak power of 700 W.

A filament pattern may be formed by generating filaments along a scribing lane. According to an embodiment, the filaments can be disposed at substantially constant spacing along a scribing lane marked on the substrate to form the pattern. As used herein, "substantially constant spacing" is intended to mean the distance between neighbor filaments can be within 10% of the average distance of the filament pattern. The distance between neighbor filaments can be the linear distance between the centers of the filaments along the surface of the substrate. The average distance can be determined by dividing the sum of all distances between neighbor filaments by the total number of spacing included in the filament pattern. According to an embodiment, a filament pattern can include an average distance of at least 0.5 µm and at most 5 µm.

According to an embodiment, a filament pattern can include at least one filament having a length smaller than the thickness of the substrate. In a particular embodiment, all of the filaments can have a length smaller than the thickness of the substrate. According to another embodiment, the filament pattern can have an average length, which can be determined by dividing the sum of the lengths of filaments by the number of the filaments. The average length can be at least 0.5 mm and at most 6 mm. In a further embodiment, the length of each filament in a filament pattern can be substantially the same, such as within 10% of the average length.

According to an embodiment, forming a filament pattern can include applying a plurality of passes of laser energy along the scribing lane. For instance, after the first pass of laser pulses, partially formed filaments may be disposed along the scribing lane, and the second or more passes may be applied to complete the formation of the filaments having a desired length. Particularly, for a substrate having a thickness greater than 2 mm, applying a plurality of passes of laser energy may be desired to form filaments extending through the full thickness of the substrate. In another embodiment, filaments may be formed sequentially such that forming a second filament may not be started before completion of the first filament, and a plurality of pulses can be applied to form each filament as needed by the application.

Figure 4:
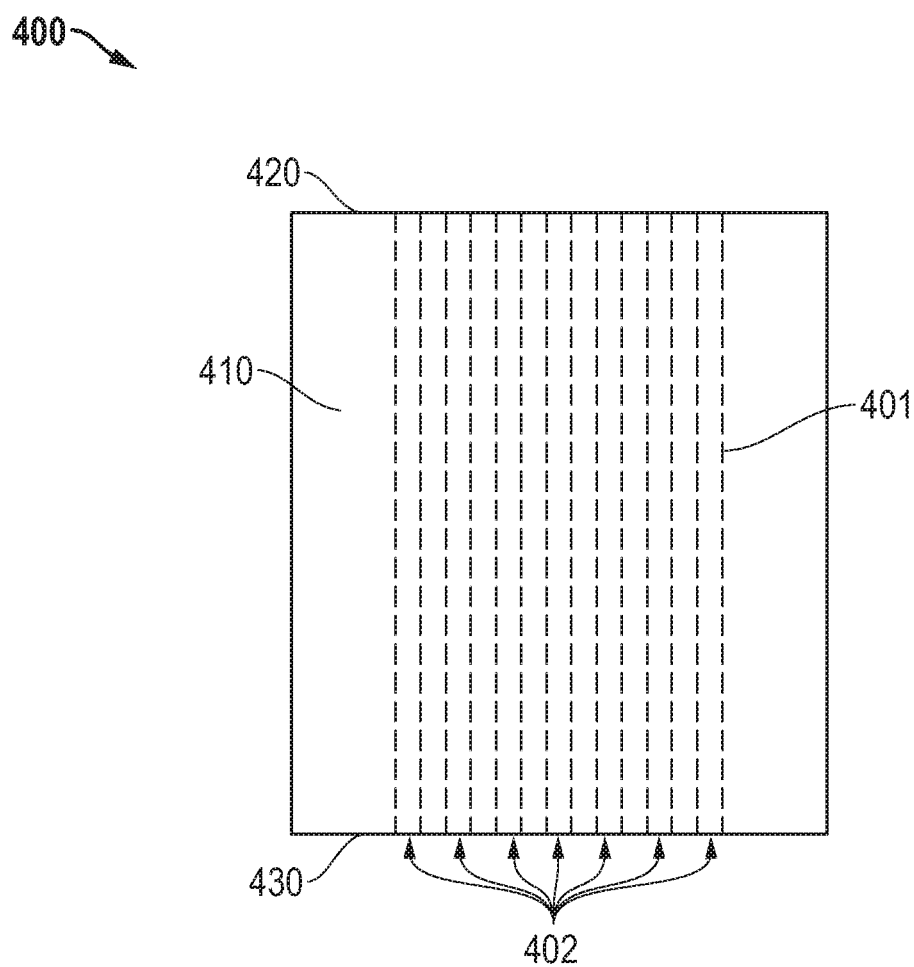
FIG. 4 includes an illustration of a structure including a filament pattern in accordance with an embodiment.

FIG. 4 includes an illustration a portion of an exemplary structure 400. The structure includes a substrate 410 having an upper surface 420 and lower surface 430. A filament pattern 401 is formed including a plurality of filaments 402 within the thickness of the substrate 410. The filaments 402 extend in the direction substantially parallel to the thickness of the substrate and are spaced apart from one another.

Figure 5:
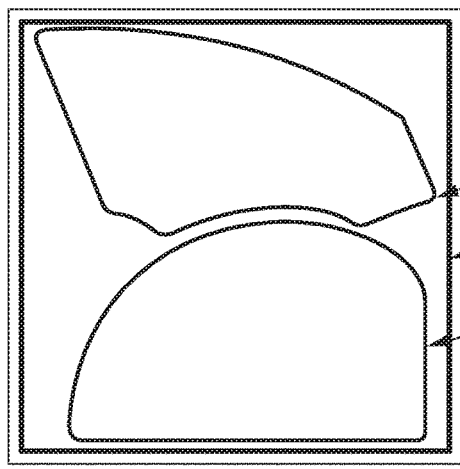
FIG. 5 includes an illustration of a top view of a structure in accordance with an embodiment.
Figure 6:
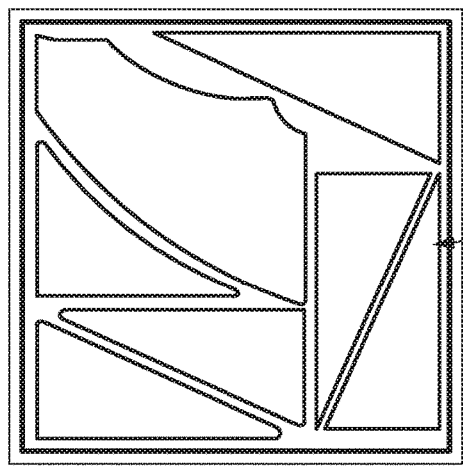
FIG. 6 includes an illustration of a top view of a structure in accordance with another embodiment.
Figure 7:
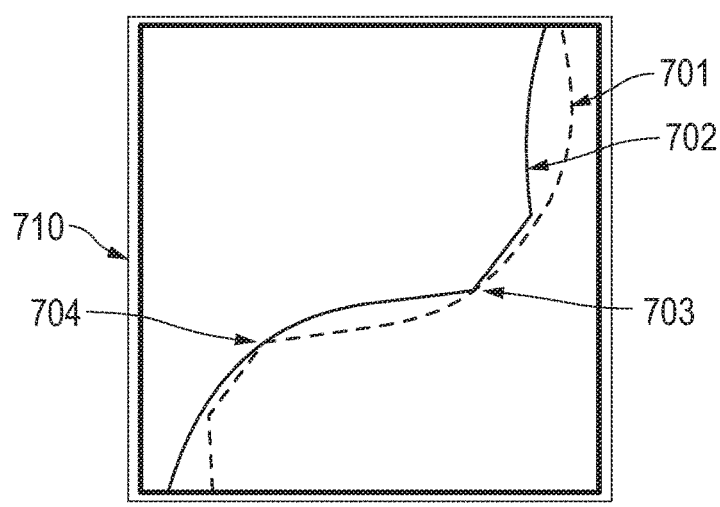
FIG. 7 includes an illustration of a top view of a structure in accordance with another embodiment.

According to a further embodiment, a plurality of filament patterns can be formed on the same substrate. FIGS. 5 to 7 include illustrations of non-limiting, exemplary layouts of scribing lanes on a motherboard. Filament patterns can be formed along the scribing lanes to facilitate separation of the substrate into a plurality of portions. FIG. 5 includes a top view illustration of a structure 500 including a substrate 510 having scribing lanes 501 and 502 marked on the top surface, each of which encloses an irregular shape. Filaments can be formed along the scribing lanes 501 and 502 to form the filament patterns outlining the portions in those shapes. The scribing lane 506 is the outline of the electrochromic stack.

According to an embodiment, a filament pattern can include a linear line, a curvy line, or a combination thereof. The lines may intersect to form an angle (e.g., an acute, obtuse, right angle, or any combination thereof). For example, the filament pattern can include an angle, a radius, or any combination thereof. In another instance, as desired, a filament pattern can include a radius of at most 5 μm, such as at most 2 μm. Filament patterns can be formed for separation of portions having complicated shapes suitable for different applications, such as windshield, side windows, or a moon roof. As illustrated in FIG. 6, a filament pattern can be formed to outline a regular geometric shape. From the illustrated top view, the filament pattern can have the shape of a triangle 602 including an acute angle and a right angle. Further filament patterns can be formed having the other outlined shapes as in the illustrated top view.

According to an embodiment, filament patterns can be entirely spaced apart from one another, such as those illustrated in FIGS. 5 and 6, and a minimum distance between two neighbor filament patterns can be at most 5 mm and at least 3 μm. The minimum distance between two neighbor filament patterns is the linear distance along the substrate surface between the centers of the two closest filaments from the neighbor patterns. The minimum distance between neighbor filament patterns can help to allow formation of separate filament patterns and reduce wasted areas between the filament patterns.

According to another embodiment, filament patterns may overlap if desired by the application. For instance, at least one filament may be part of different filament patterns. FIG. 7 includes a top view illustration of a structure 700 including a substrate 710 with scribing lanes 701 and 702, which overlap at 703 and 704. According to an embodiment, a filament pattern may be formed from the surface having the electrochromic stack, from the other surface, or simultaneously from both surfaces. In a particularly embodiment, laser energy can be applied along the scribing lane from the surface with the electrochromic stack or a coating.

Referring back to FIG. 2, the process can continue to 203, applying a thermal treatment to separate the substrate. According to an embodiment, thermal treatment can be applied by using a laser, a heating source, such as vapor or lamp, a cooling fluid, or any combination thereof. In a particular embodiment, laser can be used to apply a thermal treatment to the areas associated with the filament pattern, such as along the scribing lane. The laser can include CO laser, $CO_2$ laser, or a combination thereof. In a particular example, the thermal treatment laser can generate continuous wave. The thermal treatment laser can have a wavelength of at least 5 μm, a power of at least 200 W, a focus diameter at least 3 mm, and a speed of at least 100 mm/s.

When using a thermal treatment laser, a laser beam can be focused along the scribing lane to generate a temperature difference along the lateral direction of the substrate. In a further embodiment, cooling fluid (e.g., cooling air) may be used in combination with laser to facilitate generation of a suitable temperature gradient and thermal stress that can cause the separation of the portions. In another embodiment, increasing humidity after laser filamentation may facilitate thermal treatment and separation. For instance, water vapor may be applied to the substrate (e.g., by a nozzle) along the scribing lane after formation of the filament pattern and prior to thermal treatment.

According to a further embodiment, if forming a filament pattern close to an edge of the substrate is desired, a certain minimum distance between the filament pattern and the edge can facilitate separation along the filament pattern. Particularly, if the filament pattern includes a sharp angle that is close to the edge, have the minimum distance between the edge and the center of the closest filament can facilitate application of the thermal treatment and formation of cut edges with reduced sharpness and improved edge strength. For instance, the minimum distance can be at least 20 μm. According to another embodiment, the minimum distance may be at most 200 μm to help to reduce waste.

According to another embodiment, the thermal treatment and laser filamentation can be performed simultaneously. For instance, the thermal treatment laser can be directed to follow but spaced apart from the filamentation laser along the scribing lane. In other instances, thermal treatment laser (e.g., CO or $CO_2$) can be used after formation of the filament pattern is completed. According to another embodiment, thermal treatment can be applied along different filament patterns simultaneously using a plurality of lasers.

According to an embodiment, applying the thermal treatment can result in separation of a portion of the substrate from a remaining portion. Separation can take place along the filament pattern. Particularly, separation may not need mechanical breaking. More particularly, after separation, further additional treatment to new edges, such as grinding or polishing, may not be necessary. Mechanical breaking is used in the art to separate glass substrate. However, mechanical force would likely cause chipped edges and would not allow formation of complex shapes, such as those having an acute angle or small radius of curvature. After mechanical breaking, grinding or polishing, is more likely needed to smooth the edges.

According to another embodiment, thermal treatment for certain substrates may not be needed to separate the substrate. For instance, a chemical-tempered glass substrate can be separated spontaneously upon completion or during formation of a filament pattern.

According to an embodiment, a cut edge can be formed on the separated portion. Each filament can be divided into two channels, and a cut edge can include a plurality of channels. According to an embodiment, the structure can be separated into a plurality of portions, and each portion can include a plurality of channels on the new edges, as a result of separation of the filaments. According to a further embodiment, the cut edge can have edge strength of at least 100 MPa, such as at least 130 MPa, at least 170 MPa, and at least 240 MPa. In another instance, the edge strength can be at most 380 MPa, such as 330 MPA or 290 MPa. In a further instance, the edge strength can be within a range including any of the minimum and maximum values disclosed herein, such as within a range of at least 100 MPa and at most 380 MPa. In this disclosure, the edge strength is tested in accordance with DIN EN 1288-1/3 (2000-09), except that the test is performed on a separated substrate having the size of 150 mm×50 mm and thickness of glass 0.7 mm to 4 mm, and the distances of the loading rods and the supporting rods are 20 mm and 100 mm, respectively.

Figure 8:
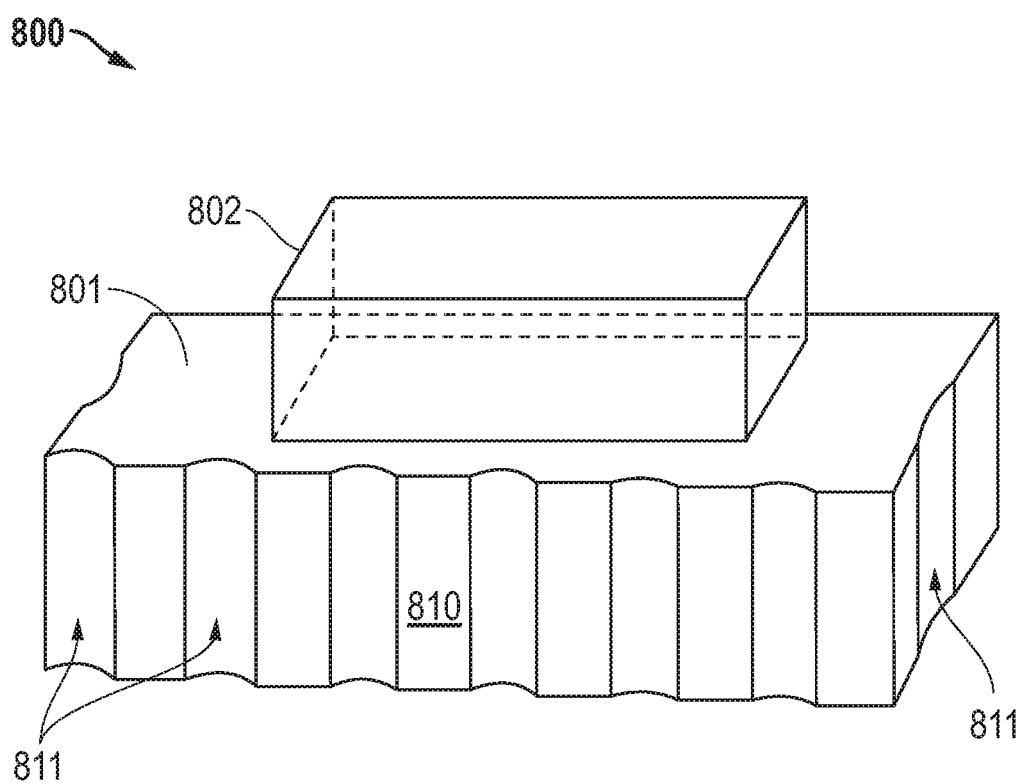
FIG. 8 includes an illustration of a perspective view of a portion of an exemplary structure in accordance with another embodiment.

FIG. 8 includes an illustration of a separated portion 800 including a cut edge 810 including a plurality of channels 811. The channels 811 can extend substantially along the thickness direction of the substrate 801. The portion 800 includes a stack 802 disposed on the substrate 801. The stack 802 can be the electrochromic stack as illustrated in FIG. 1 and include the busbars disposed as illustrated in FIG. 1. According to another embodiment, the stack 802 can include a coating, such as a widow coating or a stack of window coatings. According to a further embodiment, a separated portion, such as 800, can be an individual electrochromic device. According to still a further embodiment, the separated portion can be a switchable device or part of a switchable device. According to another embodiment, a separated portion can be further separated into smaller portions by repeating the process disclosed herein.

According to a particular embodiment, an electrochromic device can include a single substrate having a plurality of channels on at least one edge of the substrate. The channels can be spaced apart from one another and extending in the direction that is substantially parallel to the thickness of the substrate. According to a further particular embodiment, the electrochromic device can be solid state.

According to an embodiment, the electrochromic device can have edge strength of at least about 100 MPa, such as at least 130 MPa, at least 170 MPa, and at least 240 MPa. In another instance, the electrochromic device can have an edge strength of at most 380 MPa, such as 330 MPa or 290 MPa. In a further instance, the edge strength can be within a range including any of the minimum and maximum values disclosed herein, such as within a range of at least 100 MPa and at most 380 MPa.

According to another embodiment, the electrochromic device can be laminated to a separate substrate, such as an outer substrate (e.g., laminate glass pane), to form an insulated glass unit. In an embodiment, the individual electrochromic devices can have the similar size as the outer substrate. In another embodiment, the individual electrochromic devices can be smaller than the outer substrate in at least one dimension. In another embodiment, the individual electrochromic devices can be 0.5 mm to 3 mm shorter than the outer substrate in at least one dimension, such as 1 mm to 2.0 mm shorter in at least one dimension, or in all dimensions.

Figure 9:
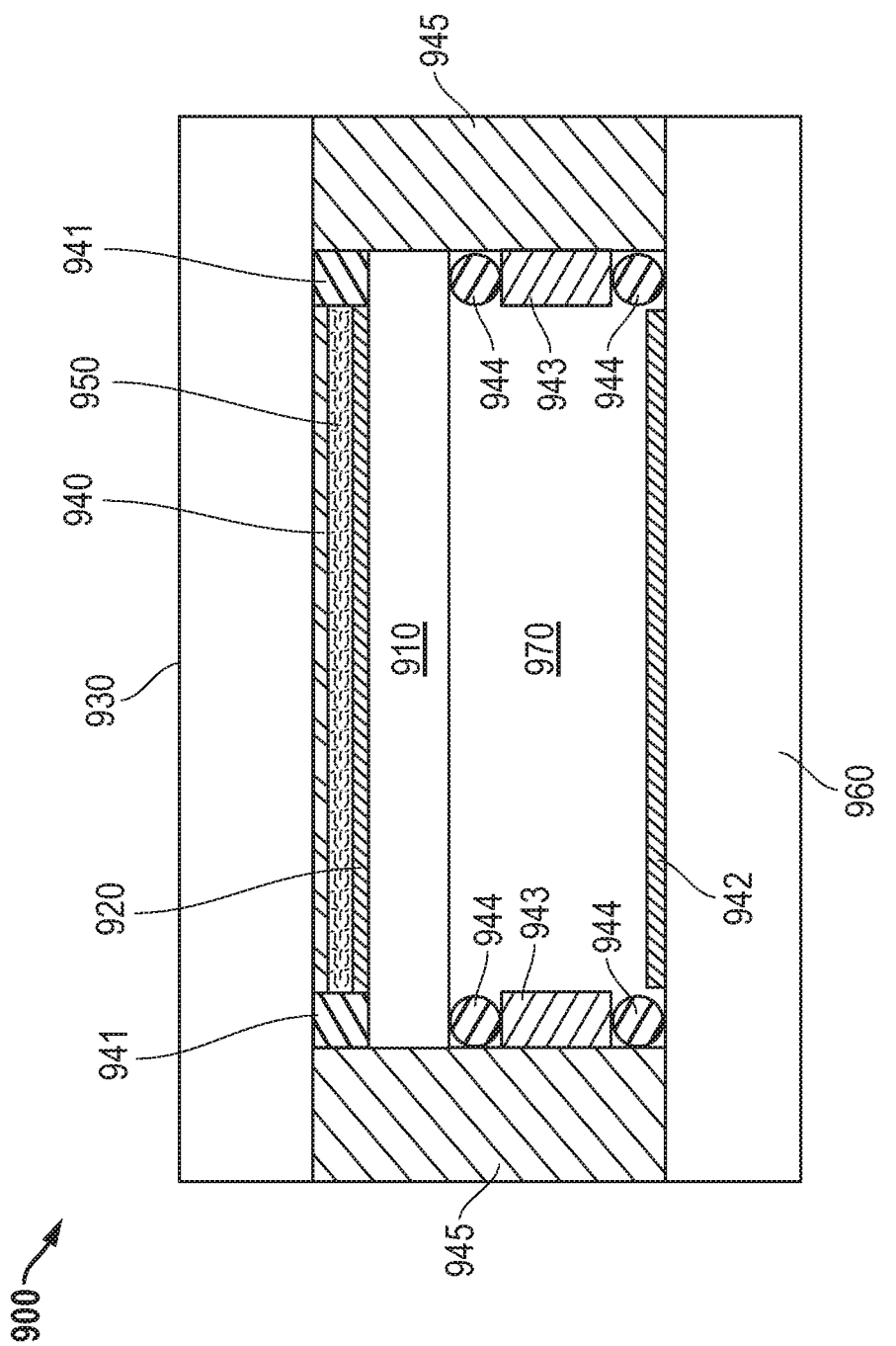
FIG. 9 includes an illustration of an exemplary insulated glass unit in accordance with an embodiment.

FIG. 9 includes an illustration of an exemplary insulated glass unit 900. The insulated glass unit 900 includes an outer separate substrate 930 and an electrochromic device including the electrochromic stack 920 and substrate 910 (channels not illustrated). A solar control film 940 is disposed between the stack 920 and the outer substrate 940, and an interlayer 950 is dispose between the solar control film 940 and the stack 920. The interlay 950 may be a lamination adhesive. The interlay 950 can include a thermoplastic, such as polyurethane, ethylene vinyl acetate (EVA) or polyvinyl butyral (PVB). A seal 941 is disposed between the substrate 910 and the outer substrate 930 and around the stack 920. The seal 941 can include a polymer, such as polyisobutylene. The outer substrate 930 is coupled to a pane 960. Each of the outer substrate 930 and pane 960 can be a toughened or a tempered glass and have a thickness in a range of 2 mm to 9 mm. A low-emissivity layer 942 can be disposed along an inner surface of the pane 960. The outer substrate 930 and pane 960 can be spaced apart by a spacer bar 943 that surrounds the substrate 910 and stack 920. The spacer bar 943 is coupled to the outer substrate 930 and pane 960 via seals 944. The seals 944 can be a polymer, such as polyisobutylene. The seals 944 can have the same or different composition as compared to the seal 941. An adhesive joint 945 is designed to hold the outer substrate 930 and the pane 960 together and is provided along the entire circumference of the edges of the outer substrate 930 and the pane 960. An internal space 970 of the IGU 900 may include a relatively inert gas, such as a noble gas or dry air. In another embodiment, the internal space 970 may be evacuated. Other designs for IGUs may be used if needed or desired for a particular application, and some other exemplary designs of IGUs are illustrated in FIGS. 10 to 13. The IGUs of FIGS. 10 to 13 can include components that are the same as those of the insulated glass unit 900. The same components are referenced using the same reference numbers.

Figure 10:
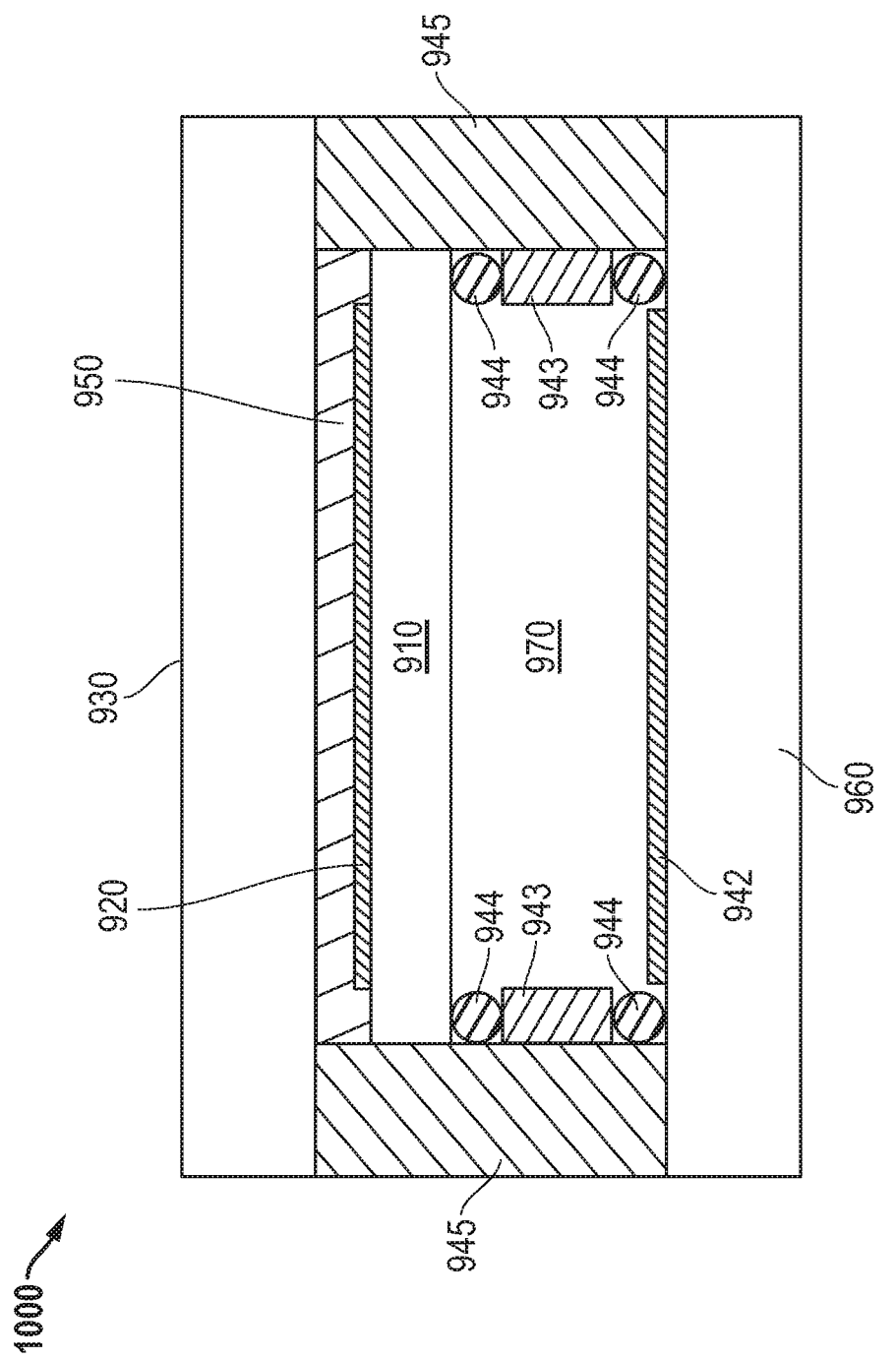
FIG. 10 includes an illustration of another exemplary insulated glass unit in accordance with an embodiment.

FIG. 10 includes an illustration of another exemplary insulated glass unit 1000. The insulated glass unit 1000 includes an electrochromic device including the electrochromic stack 920 and substrate 910 (channels not illustrated). In a particular embodiment, the substrate 910 can be annealed glass having a thickness of 2.2 mm. The interlayer 950 is dispose between the outer separate substrate 930 and the electrochromic stack 920.

Figure 11:
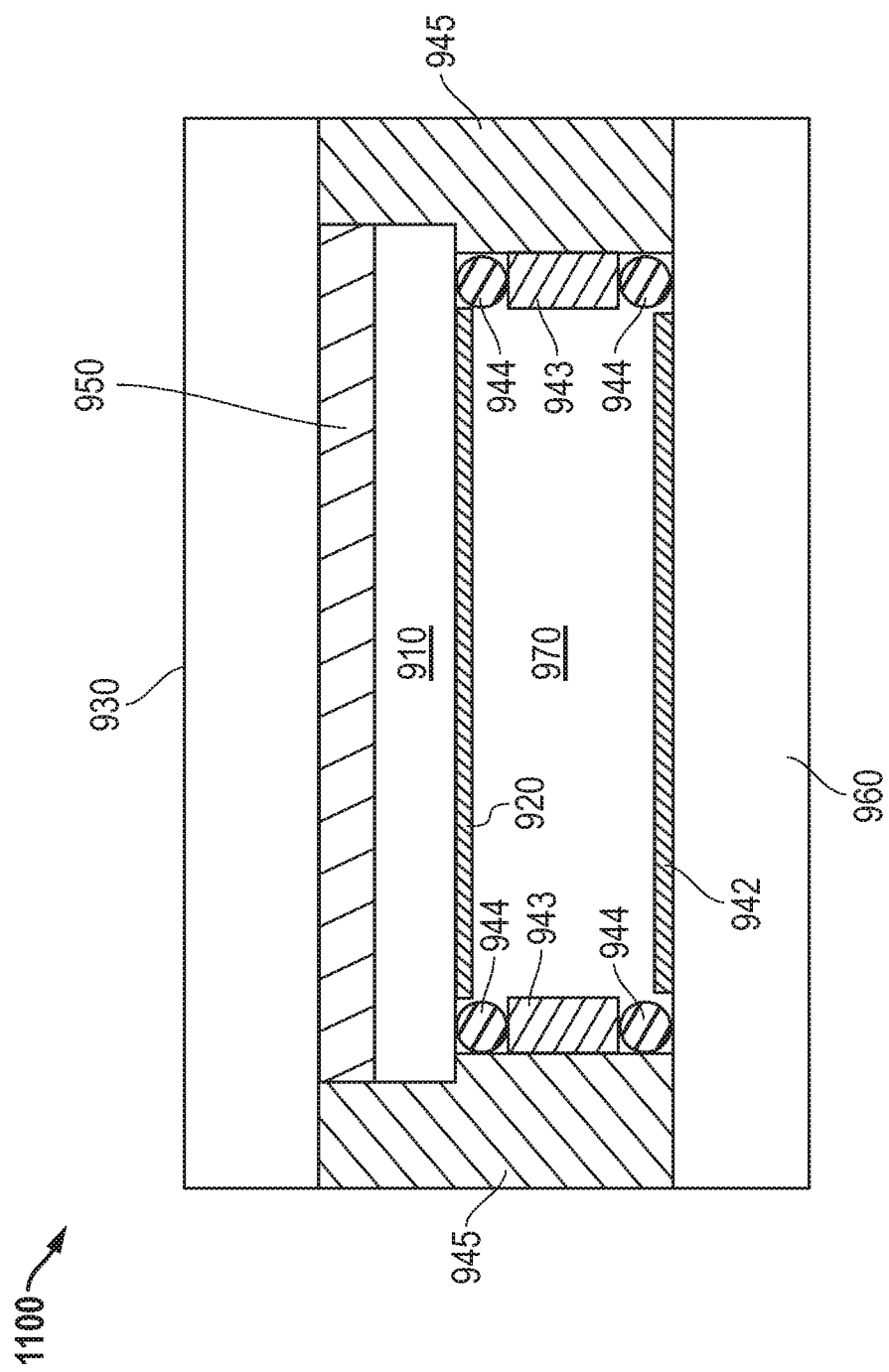
FIG. 11 includes an illustration of another exemplary insulated glass unit in accordance with an embodiment.

FIG. 11 includes an illustration of another exemplary insulated glass unit 1100. The insulated glass unit 1100 includes a similar electrochromic device to that of the insulated glass unit 1000, except that the electrochromic stack 920 is opposite the outer separate substrate 930. The interlayer 950 is disposed between the outer separate substrate 930 and the substrate 910.

Figure 12:
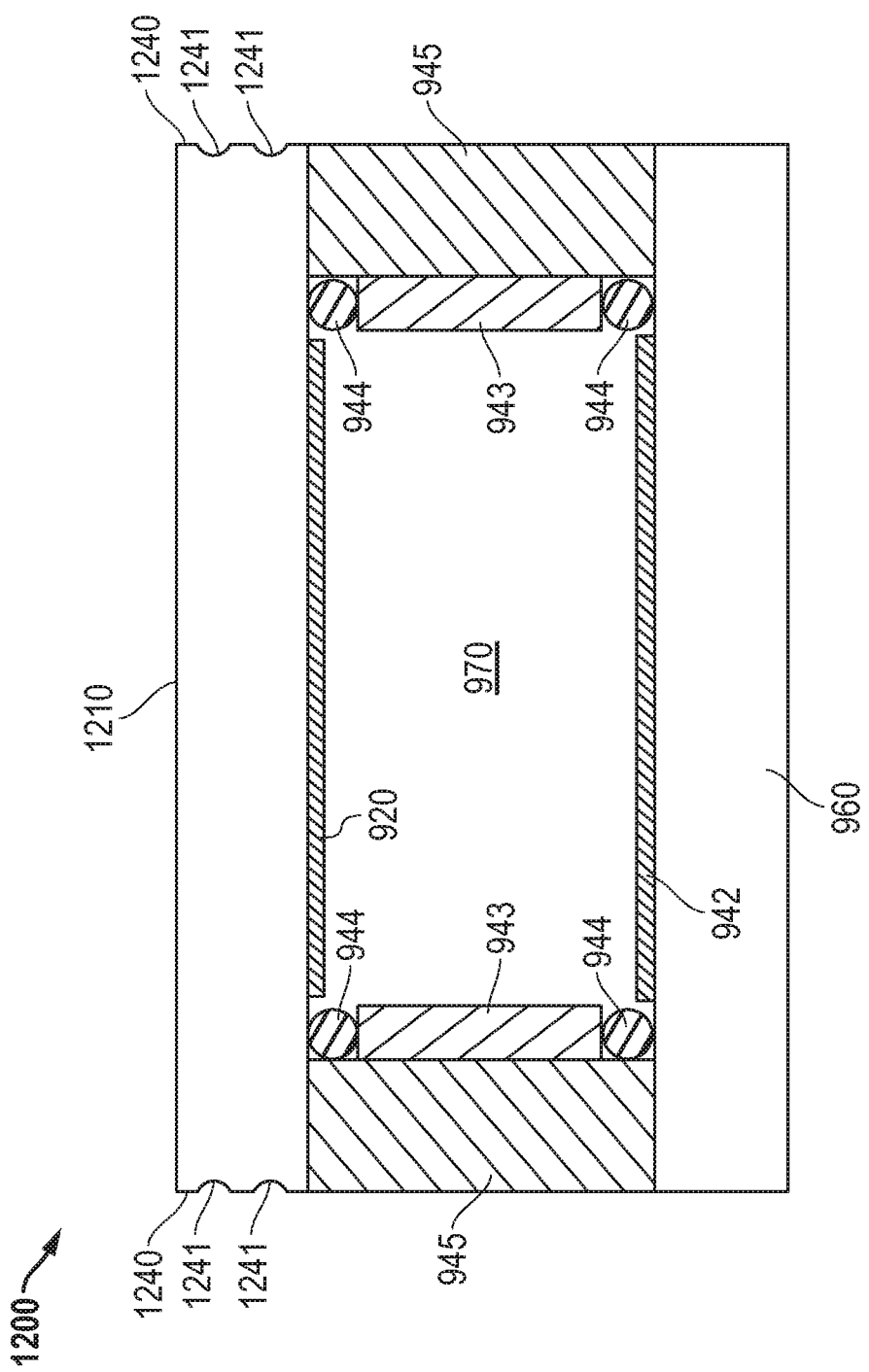
FIG. 12 includes an illustration of another exemplary insulated glass unit in accordance with an embodiment.

FIG. 12 includes an illustration of another exemplary insulated glass unit 1200. The insulated glass unit 1200 includes an outer separate substrate 1210 and an electrochromic stack 920 disposed on the outer separate substrate 1210. The outer separate substrate 1210 can be tempered or semi-tempered glass. The edges 1240 of the outer separate substrate 1210 include channels 1241 resulted from separation along a filament pattern.

Figure 13:
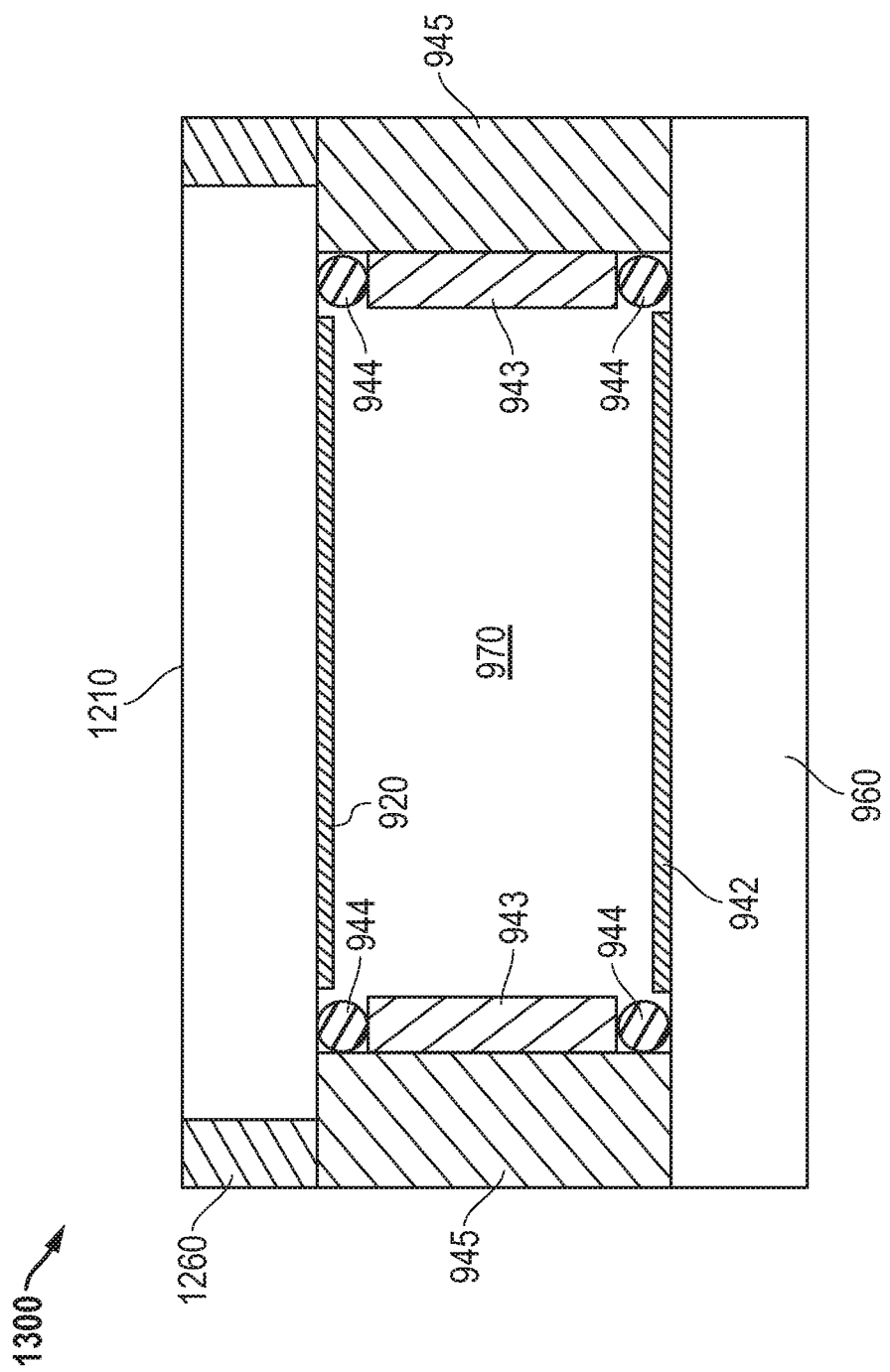
FIG. 13 includes an illustration of another exemplary insulated glass unit in accordance with an embodiment.

FIG. 13 includes an illustration of another exemplary insulated glass unit 1200. The insulated glass unit 1200 includes the outer separate substrate 1210 and the electrochromic stack 920 disposed on the outer separate substrate 1210. The edges of the outer separate substrate 1210 are covered by an edge protection 1260. In an embodiment, the edge protection can include a suitable coating that can improve edge resistance against damage of the substrate. In another embodiment, the edge protection can include a material including a polymer, metal, a composite material, or a combination thereof. In still another embodiment, the edge protection can be applied to the edges utilizing wet coating, extrusion, encapsulation, or the like.

The present disclosure represents a departure from the art. Certain embodiments are related to processes utilizing the combination of laser filamentation and thermal treatment to precisely separate a structure into portions having various shapes and sizes. The structure can include thermally semi-tempered glass, which is deemed difficult to cut in the art. The processes can be particularly suitable for forming complex shapes, such as shapes including small radiuses, triangles, rounded corners, or any combination thereof, as separation can be performed precisely. In addition, using the combination of laser filamentation and laser thermal treatment, a gap having a width as small as 2 mm can be formed between electrochromic stacks to allow separation of the structure, which can help to reduce waste of the structure. Furthermore, as separation can result in edges having high quality and mechanical strength, further treatment, such as grinding or polishing, may not be necessarily needed, and separated portions can be used directly.

Many different aspects and embodiments are possible. Some of those aspects and embodiments are described below. After reading this specification, skilled artisans will appreciate that those aspects and embodiments are only illustrative and do not limit the scope of the present invention. Exemplary embodiments may be in accordance with any one or more of the ones as listed below.

Embodiment 1. An electrochromic structure, comprising:
a substrate;
a first filament in the substrate extending in a direction substantially parallel to a thickness of the substrate; and
an electrochromic residue on the substrate.

Embodiment 2. The electrochromic structure of embodiment 1, comprising a filament pattern including a plurality of filaments, including the first filament, each filament extending in a direction substantially parallel to the thickness of the substrate.

Embodiment 3. A method, comprising:
removing a portion of an electrochromic stack from a substrate; and
forming a first filament in the substrate extending in a direction substantially parallel to a thickness of the substrate.

Embodiment 4. The method of embodiment 3, wherein the portion has a length and a minimal width of at least 2 mm.

Embodiment 5. The method of embodiments 3 or 4, wherein forming the first filament is performed by applying a pulse of laser energy to the substrate.

Embodiment 6. The method of embodiments 3 or 4, wherein forming the first filament is performed by applying a plurality of pulses of laser energy to the substrate.

Embodiment 7. The method of any one of embodiments 3 to 6, comprising forming a filament pattern including a plurality of filaments, including the first filament, each filament extending in a direction substantially parallel to the thickness of the substrate.

Embodiment 8. The method of embodiment 7, wherein the substrate has a thickness of at least 1 mm, and wherein formation of at least one filament is performed by application of at least one pass of laser energy.

Embodiment 9. The method of any one of embodiments 3 to 8, comprising applying a thermal treatment to the substrate to separate a portion of the substrate from a remaining portion of the substrate.

Embodiment 10. The method of any one of embodiments 3 to 9, comprising generating a thermal gradient in an area associated with the filament pattern in the substrate.

Embodiment 11. The method of any one of embodiments 8 to 10, wherein applying the thermal treatment comprises using a laser, a vapor, a lamp, or a combination thereof.

Embodiment 12. The method of embodiment 11, wherein the laser comprises CO laser, CO2 laser, or a combination thereof.

Embodiment 13. The method of any one of embodiments 8 to 12, wherein applying the thermal treatment comprises applying a cold fluid to an area associated with the filament pattern in the substrate.

Embodiment 14. The method of any one of embodiments 8 to 13, comprising forming a plurality of filament patterns in the substrate, each filament pattern including a plurality of filaments extending in a direction substantially parallel to the thickness of the substrate, wherein at least two neighboring filament patterns are spaced apart by a distance of at most 5 μm.

Embodiment 15. The method of any one of embodiments 8 to 14, comprising forming a plurality of filament patterns in the substrate, each filament pattern including a plurality of filaments extending in a direction substantially parallel to the thickness of the substrate, wherein at least two neighboring filament patterns are spaced apart by a distance of at least 3 μm Embodiment 16. The method of any one of embodiments 8 to 15, comprising separating a portion of the substrate from a remaining portion of the substrate along the filament pattern.

Embodiment 17. A method comprising:
forming a first filament in a substrate extending in a direction substantially parallel to a thickness of the substrate; and
applying a thermal treatment to separate a portion of the substrate from a remaining portion of the substrate.

Embodiment 18. The electrochromic structure or the method of any one of embodiments 1 to 17, wherein the filament has an aspect ratio of length to width of at least 10:1 and at most 3000:1.

Embodiment 19. The electrochromic structure or the method of any one of embodiments 2 to 18, wherein the filament pattern comprises at least one filament having a length smaller than the thickness of the substrate.

Embodiment 20. The electrochromic structure or the method of any one of embodiments 2 and 8 to 19, wherein the filament pattern comprises a radius of at most 5 μm, an acute angle, or a combination thereof.

Embodiment 21. The electrochromic structure or the method of any one of embodiments 1 to 20, wherein at least one electrochromic stack is disposed on the substrate, the electrochromic stack comprising an ion storage layer, an ion conductive layer, an electrochromic layer, or any combination hereof.

Embodiment 22. The electrochromic structure of any one of embodiments 1, 2, and 18 to 21, comprising a plurality of filament patterns, each including a plurality of filaments extending in a direction substantially parallel to the thickness of the substrate.

Embodiment 23. The electrochromic structure of any one of embodiments 1, 2, and 18 to 22, wherein the electrochromic residue comprises a portion of an electrochromic stack.

Embodiment 24. The electrochromic structure of any one of embodiments 2 and 18 to 23, comprising a filament pattern including a set of filaments orientated adjacent to an edge of the substrate.

Embodiment 25. The electrochromic structure of any one of embodiments 2 and 18 to 24, wherein the substrate comprises an edge, wherein at least a portion of the edge is defined by a plurality of channels that are spaced apart from one another, and wherein the edge has a core stress of at most 15 MPa.

Embodiment 26. The electrochromic structure of embodiment 25, further comprising a busbar that is spaced apart from the edge, wherein a minimal distance between the edge and the busbar is at least 1 mm.

Embodiment 27. The electrochromic structure of any one of embodiments 1, 2 and 18 to 26, further comprising an electrochromic stack, wherein the residue is spaced apart from the electrochromic stack by a distance of at least 2 mm.

Embodiment 28. The electrochromic structure of any one of embodiments 2 and 18 to 25, further comprising an edge protection disposed along an edge of the substrate.

Embodiment 29. The electrochromic structure of embodiment 28, wherein the edge protection comprises a material including a polymer, a metal, a composite material, or a combination thereof.

Embodiment 30. A structure, comprising:
a substrate;
a first filament in the substrate extending in a direction substantially parallel to a thickness of the substrate; and
a film overlying the substrate, wherein the film comprises a composition selected from the group consist of a low emissivity coating, indium tin oxide coating, and a silver based coating.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An electrochromic structure, comprising:
   a substrate;
   a first filament in the substrate extending in a direction substantially parallel to a thickness of the substrate;
   an electrochromic stack on the substrate, wherein the electrochromic stack comprises:
   a transparent conductive layer including a first portion and a second portion spaced apart from the first portion; and
   an electrolyte layer disposed over the first portion and the second portion of the transparent conductive layer;
   a first bus bar disposed on the first portion of the transparent conductive layer;
   a second bus bar disposed on the second portion of the transparent conductive layer; and
   an electrochromic residue on the substrate, wherein the residue comprises a composition of the transparent conductive layer and is spaced apart from the electrochromic stack by a distance.

2. The electrochromic structure of claim 1, comprising a filament pattern comprising a plurality of filaments including the first filament, each filament extending in a direction substantially parallel to the thickness of the substrate.

3. The electrochromic structure of claim 1, wherein the first filament has an aspect ratio of length to width of at least 10:1 and at most 3000:1.

4. The electrochromic structure of claim 2, wherein the filament pattern comprises at least one filament having a length smaller than the thickness of the substrate.

5. The electrochromic structure of claim 2, wherein the filament pattern comprises a curved portion having a radius of at most 5 μm, an acute angle, or a combination thereof.

6. The electrochromic structure of claim 2, wherein the plurality of filaments comprise a set of filaments orientated adjacent to an edge of the substrate.

7. The electrochromic structure of claim 1, wherein at least a portion of an edge of the substrate is defined by a plurality of channels that are spaced apart from one another, and wherein the edge has a core stress of at most 15 MPa.

8. The electrochromic structure of claim 7, wherein the first busbar is spaced apart from the edge, wherein a distance between the edge and the first busbar is at least 1 mm.

9. The electrochromic structure of claim 2, comprising a plurality of filament patterns, each including a plurality of filaments extending in a direction substantially parallel to the thickness of the substrate.

10. The electrochromic structure of claim 1, wherein the electrochromic residue comprises a portion of an electrochromic stack.

11. An insulated glass unit, comprising:
    an electrochromic structure comprising an electrochromic stack on a substrate,
    wherein the electrochromic stack comprises:
    a transparent conductive layer;
    an electrolyte layer disposed over the transparent conductive layer; and
    a first bus bar disposed on a first portion of the transparent conductive layer;
    a second bus bar disposed on a second portion of the transparent conductive layer, wherein the first portion of the transparent conductive layer is spaced apart from the second portion of the transparent conductive layer; and
    wherein the substrate comprises:
    a cut edge including a plurality of spaced-apart channels extending substantially along a thickness of the substrate.

12. The insulated glass unit of claim 11, further comprising an edge protection applied to the edge of the substrate, wherein the edge protection comprises a polymer, a metal, a composite material, or a combination thereof.

13. A method, comprising:
   removing a portion of an electrochromic stack from a substrate, wherein the electrochromic stack comprises a transparent conductive layer and an electrolyte layer disposed over the transparent conductive layer;
   disposing a first bus bar on a first portion of the transparent conductive layer;
   disposing a second bus bar on a second portion of the transparent conductive layer, wherein the first portion of the transparent conductive layer is spaced apart from the second portion of the transparent conductive layer; and
   forming a first filament in the substrate extending in a direction substantially parallel to a thickness of the substrate.

14. The method of claim 13, wherein the portion has a length and a minimal width of at least 2 mm.

15. The method of claim 13, wherein forming the filament is performed by applying a pulse of laser energy to the substrate.

16. The method of claim 13, wherein forming the filament is performed by applying a plurality of pulses of laser energy to the substrate.

17. The method of claim 13, comprising forming a filament pattern including a plurality of filaments including the first filament, each filament extending in a direction substantially parallel to the thickness of the substrate.

18. The method of claim 17, wherein the substrate has the thickness of at least 1 mm, and wherein formation of the filament pattern is performed by application of at least one pass of laser energy.

19. The method of claim 13, comprising applying a thermal treatment to the substrate to separate a portion of the substrate from a remaining portion of the substrate.

20. The method of claim 17, comprising generating a thermal gradient in an area associated with the filament pattern in the substrate.

* * * * *